Figure 5:
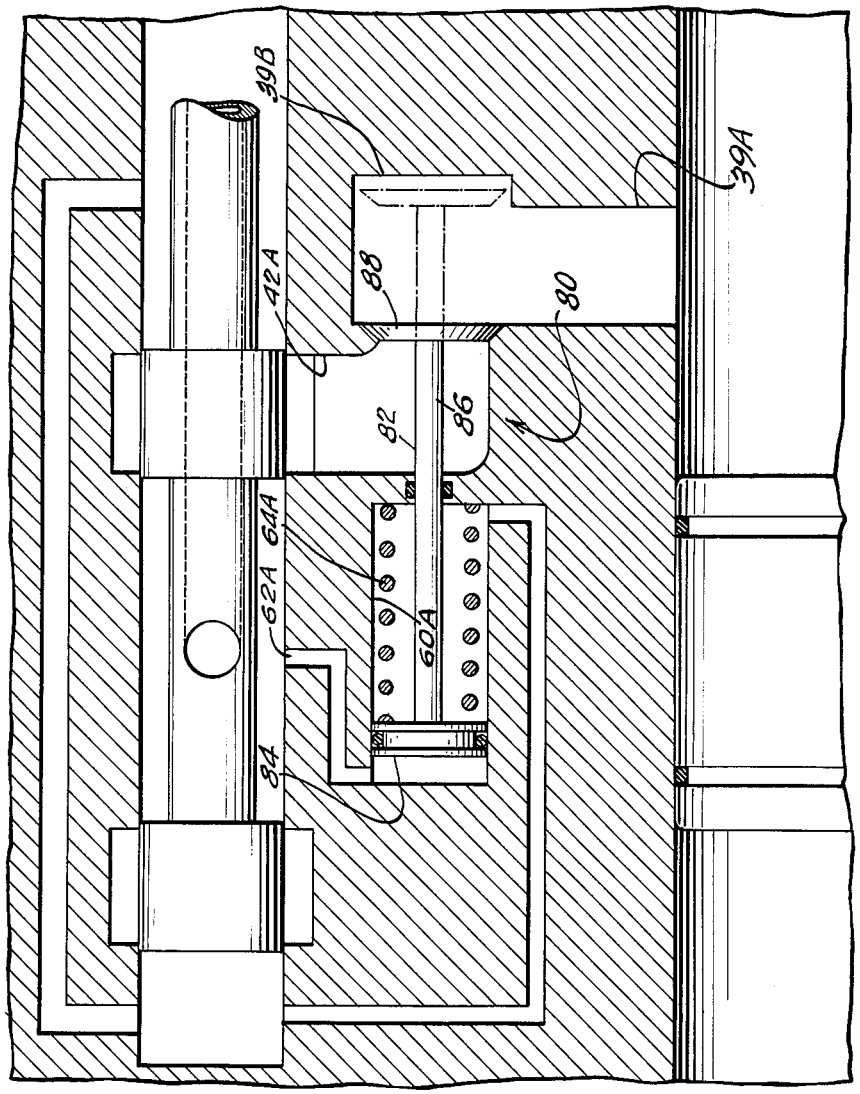

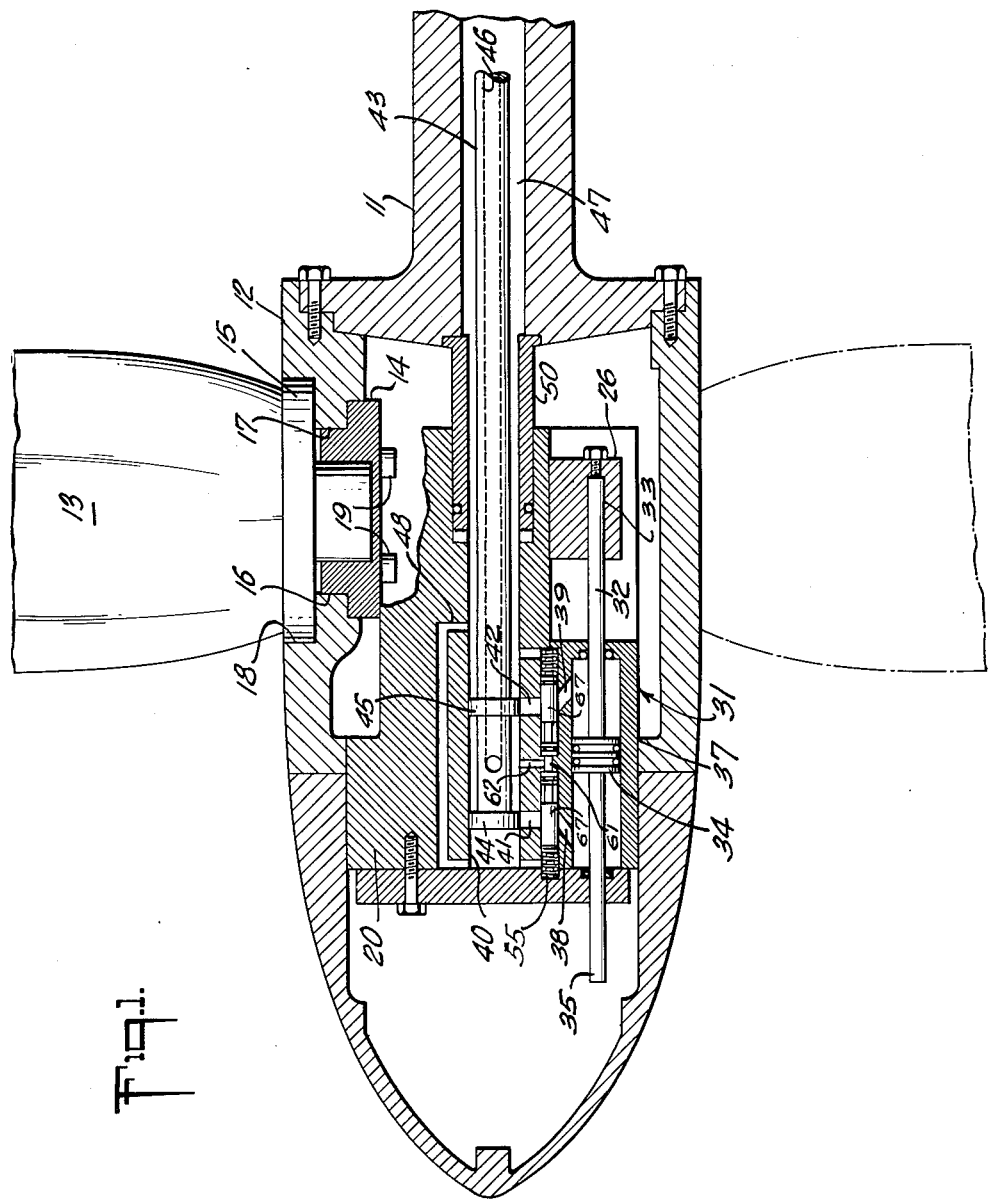

Nov. 23, 1965    J. W. BARDEN    3,219,121
CONTROLLABLE PITCH PROPELLER HYDRAULIC LOCKING DEVICE
Filed Aug. 3, 1962    4 Sheets-Sheet 2
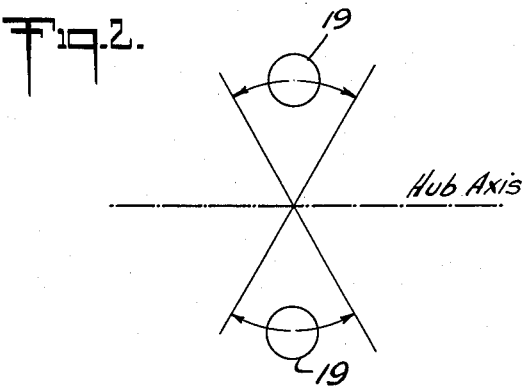
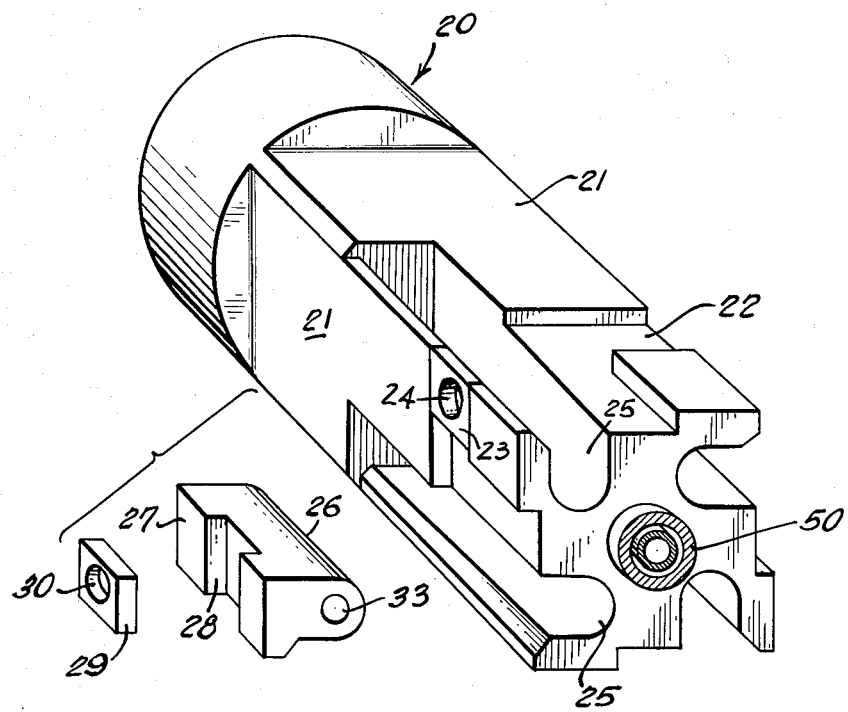
INVENTOR.
JOHN W. BARDEN
BY
Arthur L. Bowers
AGENT Nov. 23, 1965  J. W. BARDEN  3,219,121
CONTROLLABLE PITCH PROPELLER HYDRAULIC LOCKING DEVICE
Filed Aug. 3, 1962  4 Sheets-Sheet 3
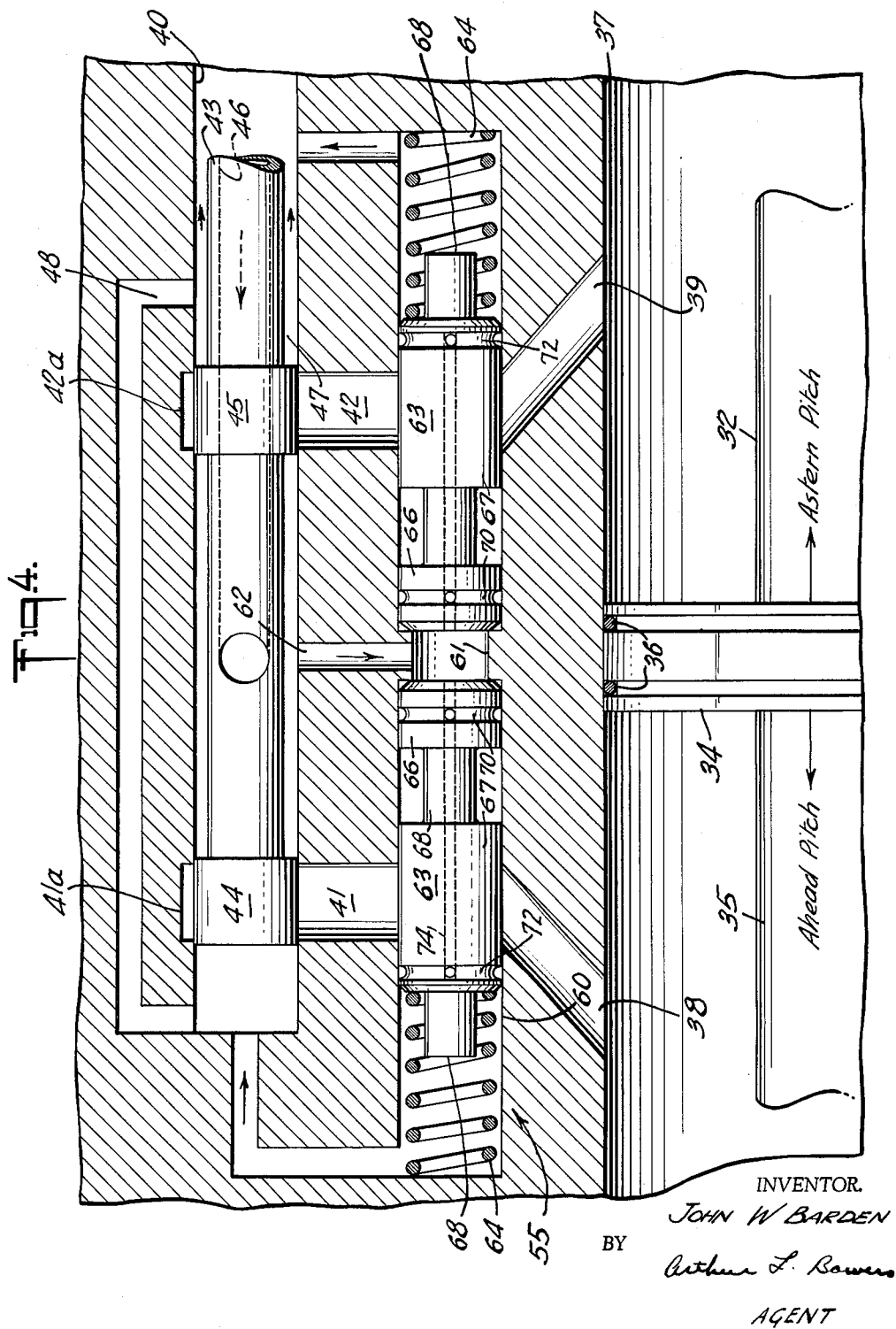
INVENTOR.
JOHN W BARDEN
BY
Arthur L. Bowers
AGENT Nov. 23, 1965   J. W. BARDEN   3,219,121
CONTROLLABLE PITCH PROPELLER HYDRAULIC LOCKING DEVICE
Filed Aug. 3, 1962   4 Sheets-Sheet 4

INVENTOR.
JOHN W. BARDEN
BY
Arthur L. Bowers
AGENT

United States Patent Office 3,219,121
Patented Nov. 23, 1965

3,219,121
CONTROLLABLE PITCH PROPELLER HYDRAULIC LOCKING DEVICE
John W. Barden, 508 Cleve Drive, Falls Church, Va.
Filed Aug. 3, 1962, Ser. No. 214,771
4 Claims. (Cl. 170—160.31)
(Granted under Title 35, U.S. Code (1952), sec. 266)

The invention described herein may be manufactured and used by or for the Government of the United States of America for governmental purposes without the payment of any royalties thereon or therefor.

This invention relates to locking and unlocking a hydraulically operable servomechanism as in controllable pitch propellers as a function of the level of hydraulic pressure for operating the hydraulic mechanism.

Controllable pitch propellers have been made with a number of kinds of blade locking devices. One type includes a large spring in the hub which urges the blades to maximum or full ahead pitch when hydraulic pressure to the hydraulically operated servomechanism is lost. Another type is made with sufficient inherent friction in the pitch controlling elements to resist displacement of the blades out of a given pitch setting when hydraulic pressure to the servomechanism is lost. Another type of propeller has a mechanical locking device which is actuated from inside the vehicle to lock the servomechanism. The disadvantage of the spring for urging the blades to full ahead pitch is that upon loss of pressure is that this arrangement often overloads the engine. Frictional self-locking designs are not desirable because of added load on the pitch adjusting elements and because of unreliability for long term use. Lastly, before one can actuate a mechanical lock for the servomechanism from inside the vehicle, the propeller shaft must be stopped.

An object of this invention is to automatically lock a hydraulically operable servomechanism as in a controllable pitch propeller upon loss or substantial reduction of the hydraulic pressure and to lock the servomechanism in the position it occupies when the hydraulic pressure is lost whether the loss of pressure is accidental or intentional. A further object is to automatically unlock the servomechanism for selective adjustment when the hydraulic pressure is returned to the level suitable for operating the servomechanism.

A further object is to lock a controllable pitch propeller at a selected pitch and to subsequently unlock the propeller for pitch adjustment while the propeller is rotating.

A further object is to provide a hydraulically operable controllable pitch propeller in which the hydraulic pumps may be secured and the propeller pitch locked and in which the propeller pitch is automatically unlocked when the hydraulic pumps are returned to operation.

A further object is to provide a hydraulic pressure operated controllable pitch propeller wherein the hydraulic pumps producing the hydraulic pressure may be secured and the blades locked at a selected pitch for cruising.

Other objects and advantages will appear from the following description of an example of the invention, and the novel features will be particularly pointed out in the appended claims.

FIG. 1 is a cross section of a controllable pitch propeller according to this invention taken on line 1—1 of FIG. 3 and including the hub and blade structure not shown in FIG. 3, FIG. 2 is a diagrammatic sketch to illustrate the range of angular adjustment of the blades, FIG. 3 is a perspective view of the main servo block included in FIG. 1 on a larger scale, FIG. 4 is a view in cross section of the pitch lock shown in FIG. 1 on a substantially larger scale, and FIG. 5 is a view cross section of another form of pitch lock mechanism for the combination shown in FIG. 1.

One example of a controllable pitch propeller which may be readily modified in accordance with the teachings of this invention is shown in U.S. Patent 2,925,131.

In FIG. 1, there is shown a propeller shaft 11 bolted to a hollow propeller hub 12 with one of four radial propeller blades 13 shown journalled in the wall of the hub. The journal arrangement for each blade includes a flanged nut 14 threaded on base 15 of blade 13 and forming therewith a circular channel 16 in relative sliding registration with a circular inward flange 17 in the journal opening 18 of the propeller hub wall. Each flanged nut has two crank pins 19 extending longitudinally from the head thereof and equally spaced from the axis along a diameter of the nut. The relative angular orientation of the propeller blades and the crank pins on the respective flanged nuts 14 is the same for the four blades. The pitch of all the propeller blades is adjusted in unison by the simultaneous application of identical force couples to the paired crank pins to angularly displace all the propeller blades equally in the same angular direction as seen from the hub axis. For convenience of illustration, the flanged nut 14 is shown in FIG. 1 rotated 90 degrees out of its mean orientation. The actual range of crank pin positions relative to the hub axis is shown in FIG. 2.

A main servo block 20 is slidable longitudinally in the hub. Block 20, shown in perspective in FIG. 3 is symmetrical about a longitudinal axis, has a circular portion at one end where it engages the inside of the hub wall for axial sliding movement therein and for the remainder of its length is approximately square. In each of the four faces 21 of block 20 there is formed a transverse guideway 22 for a slide block 23 formed with a bore 24. Corresponding ones of the crank pins 19 of flanged nuts 14 are located in the bore 24 of the respective slide blocks 23 and rotatable therein. With one crank pin of each pair thus assembled in slide blocks 23 and the slide blocks assembled in slideways 22, all the blades have the same angular orientation with respect to the hub for all longitudinal positions of the block 20 in the hub. In the mean angular orientation of the blades as in FIG. 2, the slide blocks are in their outermost position. When the piston block is moved forwardly or rearwardly in the hub, the propeller blades are angularly shifted to increase or decrease blade pitch and the slide blocks 23 are displaced transversely inwardly in the respective guideways 22.

Each of the four faces 21 is formed with a recessed guideway 25 extending inwardly from the end of the piston block for a substantial portion of its length. An auxiliary servo block 26 is slidably supported for reciprocation along the recesses 25. The face 27 of auxiliary servo block facing outwardly of the recess is transversely slotted to form a guideway 28 for a slide block 29 with a bore 30 substantially identical to slide block 23. The other crank pin 19 of each of the crank pin pairs is located in bore 30 of slide block 29 and rotatable therein. When the main servo block 20 slides forwardly in the hub, each of the auxiliary servo blocks slides in the opposite direction in the main servo block a distance equal to twice the distance traversed by the main servo block in the hub.

To adjust blade pitch, the main servo block 20 and the four auxiliary servo blocks 26 are displaced in opposite directions in the hub whereby both crank pins 19 of all the blade assemblies are impelled at the same time in a direction to angularly displace the blades in unison. The servo blocks are displaceable by respective hydraulic assemblies 31. Hydraulic assembly 31 includes a piston rod 32 secured in the longitudinal bore 33 of auxiliary servo block 26 and secured to a piston 34. A rod 35 of larger diameter than the piston rod is secured to the opposite side of piston 34 in line with rod 32 to balance the displacement of hub cavity oil during stroking of the main servo block and piston rods. The piston 34 includes O-ring seals 36 and is supported for reciprocation in a piston cylinder 37 formed in the main servo block 20. Hydraulic fluid passages 38 and 39 open into each end of the cylinder 37. The piston 34 is displaced when fluid pressure is increased on one side of the piston and fluid is permitted to exit from the other side.

The hydraulic fluid circuit for operating the pistons extends through an axial bore 40 in the main servo block 20. Hydraulic passages 41 and 42 that open into the axial bore 40 are in line with and in fluid communication with the hydraulic passages 38 and 39 when the pitch adjusting system is in operation. The bore 40 is formed with circular recesses 41a and 42a where the passages 41 and 42 open into the bore. A valve stem 43 is slidably supported for longitudinal displacement in the bore 40. The end of the valve stem extends into the vicinity of the hydraulic passages 41 and 42 and has two piston-like flanges 44 and 45 which are closely fitted in the bore 40 and which are spaced apart and are of suitable width in the axial direction for substantially blocking passages 41 and 42 and recesses 41a and 42a. A hydraulic passage 46 for coupling to a hydraulic pressure source at the other end of valve stem, not shown, extends axially through the valve stem and opens outwardly between the piston-like flanges 44 and 45. The cylindrical clearance space 47 between the valve stem 43 and the surrounding wall of bore 40 is part of the return path for the hydraulic fluid back to the fluid pressure source. A fluid passage shunt 48 in the block 20 establishes fluid communication between the inner end of bore 40 and the cylindrical clearance space 47 between valve stem 43 and bore 40. When the valve stem is displaced rearwardly, toward the left in FIG. 4, the hydraulic passage 41 is joined in fluid communication with the high pressure passage 46 through the valve stem, and the hydraulic passage 42 is opened to the fluid return passage 47 surrounding the valve stem. If there is sufficient hydraulic pressure in the passage 46 of the valve stem, the main servo block is displaced rearwardly and the auxiliary servo blocks are displaced forwardly, toward the right in FIG. 4, until they reach their limit of travel or until the valve stem is returned to the position in which the hydraulic passages 41 and 42 are blocked. Conversely, when the valve stem is displaced forwardly toward the right in FIG. 4, the hydraulic passage 41 is opened to the shunt passage 48 and thereby to the fluid return passage 47 and the passage 42 is coupled in fluid communication with the high pressure passage 46.

A sleeve 50 having an inside diameter approximately the same as that of the bore 40 is slidable in an axial recess extending into the noncircular end of the main servo block 20 and the other end of sleeve 50 is affixed to the propeller shaft, and serves as a bridge in the fluid return passage from the main servo block to the propeller shaft.

With the apparatus thus far described, a pitch setting drifts gradually because of fluid leakage past the valve. Furthermore, if hydraulic pressure is lost accidentally when the propeller is rotating, the blade pitch is progressively reduced by the mechanical impedance of the medium in which the propeller rotates. Pitch locking mechanism 55 locks the propeller pitch when hydraulic pressure is lost or reduced accidentally below a predetermined pressure level or is shut off intentionally. The pitch locking mechanism includes a valve guideway 60 parallel to and between the cylinder 37 and bore 40 and having a constriction 61 intermediate the ends. Both ends of the guideway 60 are joined in fluid communication with the return passage 47 around the valve stem 43. A pressure monitor passage 62 extends from the constricted center of the guideway 60 to the axial bore 40 of the main servo block. A pair of spool valves 63 are slidably fitted in the guideway 60 on either side of the constricted portion 61. Coil springs 64 urge the spool valves into abutment with the constricted center of the passage 60. Each spool valve has a head portion 66, a body portion 67, with a reduced diameter neck portion 68 therebetween, and a foot portion 68 at the other end of body portion 63 whose diameter is less than the inside diameter of the spring 64. The lengths of the guideway and of the several portions of the spool valve are designed for the body portion 63 to center about, overlap, and block the openings of the passages 38, 39, 41, 42 when the spool valve is in the innermost position with the head end 66 butting the shoulder of the constricted portion 61, and are also designed for the neck portion 68 to be centered about and extend transversely across and bridge the passages 38 and 41 and 39 and 42. The spring 64 is designed to have a spring constant and length to urge the spool valve against the shoulder of the constricted portion 61 when the hydraulic pressure is below a predetermined level and to be fully compressed, i.e., the foot portion 68 abuts the end of the guideway when the hydraulic pressure exceeds a predetermined level. When hydraulic pressure is lost, the spool valves are urged by their springs into abutment with the guideway constriction, and the body portions of the spool valves create a hydraulic lock on each end of the servo piston thereby locking the propeller blades at that particular pitch setting. This arrangement provides for the pitch to be locked in any position for extended operation without operating the hydraulic pumps for the system. The pitch can be changed quickly by restarting the hydraulic pump. However, in the event of accidental loss of servo pump pressure, the blades are automatically locked at the existing pitch setting. Circular recesses 70 and 72 are formed in the periphery of the head portion 66 and in the remote end of the periphery of the body portion 63 respectively, of the spool valve. A fluid passage 74 extends from the head end 66 of the valve and opens into each of the circular recesses 70 and 72 and adds to the effectiveness of the hydraulic lock.

The main servo block is shown on the drawing as one integral block but it may be formed of sections joined together. Where one integral block is used, the passages are drilled or bored and portions of the holes are plugged and sealed to form the main servo block structure described.

In FIG. 5 there is shown another pitch locking mechanism 80 in accordance with this invention. Only one half the valve structure for this embodiment is shown for ease of illustration, the other half which is substantially identical thereto is in another plane. Fluid passages 39A, 42A, a valve guideway 60A, pressure monitor passage 62A and a fluid return passage in the block shown in FIG. 5 serve the same functions as the correspondingly designated structure in the other embodiment. A poppet valve 82 having a piston 84 at one end which is reciprocable in the guideway 60A and is biased by compression spring 64A toward the left hand end of guideway 60A. A valve stem 86 extends through the wall between guideway 60A and fluid passage 42A and a fluid seal therein, and a valve member 88 at the other end of the valve stem 86 either nests in the valve seat between passages 39A and 42A or is displaced to the right, as shown in broken lines, in the enlarged portion 39B of passage 39A.

In the U.S. Patent 2,925,131, the valve portion of the valve stem is forward of the servo block and the fluid passages extend therefrom to the opposite faces of the servo pistons. The structure shown in the patent may be modified in accordance with the teachings of this invention to include valve locking arrangements substantially identical to those described herein around the valve portion of the valve stem which is forward of the servo block. This alternate arrangement is less compact but is simpler to fabricate and assemble.

While one valve lock arrangement has been described for each of the servo pistons, this invention may be practiced with one valve lock arrangement for two servo pistons or for all servo pistons provided slower response time is acceptable and the reduced safety factor of less than one valve lock per servo piston is acceptable and the propeller assembly is dynamically balanced.

The spool valve embodiment has the advantage of fewer parts than the poppet valve embodiment but it leaks more than the poppet valve embodiment. However, the rate of leakage is sufficiently low for accomplishing the purpose of locking the pitch for a period of time. The poppet valve embodiment, while more expensive than the spool valve embodiment is capable of a better fluid seal and can hold a pitch setting for very long periods of time with substantially no creeping of the propeller blades.

A number of the more salient advantages of this invention over the prior art are as follows. Any pitch setting of the hydraulically operated servo-mechanism is substantially instantly locked when the hydraulic pressure for operating the servomechanism is lost. Any selected pitch setting can be retained for an extended period of time without operating the hydraulic pumps for the hydraulic system. Any locked pitch setting can be unlocked and changed very quickly merely by restoring the hydraulic pressure and by adjusting the valve stem. In the event that there is damage to the hydraulic system resulting in loss of hydraulic pressure, the blade pitch is locked and retains its then existing setting for a substantial period of time whereby there is ample time for repairs to the system and for restoration of pressure. In a submarine, when quiet evasive operation is advisable the hydraulic pump noise can be eliminated without disturbing the blade pitch.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A propeller comprising a hub and angularly adjustable propeller blades journalled therein, a pair of crank pins connected to each of said blades for angularly adjusting the same, a main pitch-adjusting servo block symmetrical about an axis therethrough positioned in said hub for limited sliding movement axially to and fro in said hub and coupled with one crank pin of each blade, a plurality of identical auxiliary pitch-adjusting servo blocks, one for each blade, symmetrically distributed in the main servo block for sliding movement therein parallel to the main servo block axis and coupled to the second crank pin of each of said blades respectively, whereby said blades are angularly adjustable in unison when pressure is applied between said main block and auxiliary blocks to cause sliding of said main block in one direction and sliding of said auxiliary blocks in the opposite direction, piston cylinders formed in said main block in line with the respective auxiliary blocks and having forward and rearward ends, a piston in each cylinder, connecting rods extending through the rearward ends of the cylinders rigidly joining the pistons and auxiliary blocks respectively, an axial bore in said main block having forward and rearward ends, the forward end of the axial bore and the forward ends of the piston cylinders being adjacent, forward hydraulic passages in the block extending from the forward ends of the piston cylinders and opening into the axial bore substantially at the forward end, rearward hydraulic passages in the block extending from the rearward ends of the piston cylinders and opening into said axial bore a selected distance rearward of the openings of the first-mentioned hydraulic passages, a valve stem having a pair of flanges spaced apart for blocking the openings of said hydraulic passages into the axial bore in one position of said valve stem, a bore in the valve stem extending from its rearward end and opening outward between the flanges, a plurality of slidable valve means, each of said valve means having two opposed ends, one of said valve means slidable endwise across each of the forward and rearward passages extending between the piston cylinders and the axial bore and movable in directions essentially parallel to the propeller axis and transverse to the respective hydraulic passage and spring-biased to normally block all the hydraulic passages and movable against the spring bias to unblock the passages, hydraulic passages extending between corresponding ends of all said valve means and the portion of the axial bore between the forward and rearward hydraulic passage openings and hydraulic passages extending between the other ends of all said valve means and the axial bore beyond the range of movement of the flanges whereby when there is established higher than a preselected pressure in the bore of said valve stem, said valve means are moved to unblock their respective hydraulic forward and rearward passages, and when there is less than said preselected pressure in the bore of said valve stem, said valve means are moved to block their respective hydraulic passages, and whereby when the fluid pressure is sufficient to move said valve means to unblocking position, said pistons may be moved forwardly or rearwardly in their piston cylinders by moving the axial stem rearward or forward respectively to direct fluid under pressure from the axial bore in the valve stem to the forward or rearward ends of the piston cylinders and permitting fluid return from the other ends of said cylinders to the axial bore of main block.

2. A propeller as defined in claim 1 wherein said valve means are spool valves.

3. A propeller as defined in claim 2 wherein said valve means are poppet type valves.

4. A propeller comprising a hub and angularly adjustable propeller blades journalled therein, a piston and cylinder in said hub, a pair of hydraulic lines opening into the two ends of the cylinder for use in establishing a pressure differential across the piston for forcing the piston to selected positions between the ends of the cylinder, means linking said piston and cylinder with the propeller blades to angularly orient the propeller blades in the hub as a function of the position of the piston in the cylinder, a pair of valve means movable along paths intersecting said hydraulic lines respectively, and spring-biased to normally block the hydraulic lines, a hydraulic pressure conduit, a hydraulic return conduit, another hydraulic line providing continuous fluid communication between the hydraulic pressure conduit and both valve means to transmit continuously hydraulic pressure in the hydraulic pressure conduit to the valve means in opposition to the spring bias, and control means selectively operable either for blocking the hydraulic lines opening into the ends of cylinder or for providing fluid communication between the hydraulic pressure conduit and either side of said piston and concurrently providing fluid communication between the fluid return conduit and the other side of said piston, whereby said blades are locked relative to said hub whenever there is insufficient hydraulic pressure to force and hold said valve means in unblocking position.

References Cited by the Examiner

UNITED STATES PATENTS

| | | | |
|---|---|---|---|
| 2,343,416 | 3/1944 | Keller | 170—160.2 |
| 2,524,055 | 10/1950 | Hubert | 91—420 X |
| 2,609,057 | 9/1952 | Crowhurst | 170—160.32 |
| 2,720,755 | 10/1955 | Gardiner | 91—420 X |
| 2,745,499 | 5/1956 | Berninger | 170—160.21 |
| 2,766,585 | 10/1956 | Wittren | 91—421 X |
| 2,889,888 | 6/1959 | Fairhurst | 170—160.2 |
| 2,925,131 | 2/1960 | Willi | 170—160.32 |
| 3,067,825 | 12/1962 | Chilman | 170—160.2 |

FOREIGN PATENTS

| | | |
|---|---|---|
| 562,845 | 7/1944 | Great Britain. |
| 706,338 | 3/1954 | Great Britain. |

SAMUEL LEVINE, Primary Examiner.

ABRAM BLUM, JULIUS E. WEST, Examiners.